United States Patent Office
2,890,150
Patented June 9, 1959

2,890,150

CUPROUS DERIVATIVES OF SUBSTITUTED CYCLIC THIOUREAS

Maynard M. Baldwin, Columbus, Ohio, assignor, by mesne assignments, to Phelps Dodge Corporation, New York, N.Y., a corporation of New York; Anaconda Copper Mining Company, New York, N.Y., a corporation of Montana; and Kennecott Copper Corporation, New York, N.Y., a corporation of New York

No Drawing. Application April 6, 1956
Serial No. 576,538

17 Claims. (Cl. 167—33)

This invention relates to copper-containing chemical compounds, compositions including the same and to processes for the preparation and utilization of these compounds and compositions. More particularly, it relates to cuprous thione compounds and hydrohalide acid salts thereof, compositions including the same, and to processes for the preparation and utilization of these compounds and compositions as fungicides.

It is well known in the fungicide art that many copper compounds are active fungicides. However, in the field of plant pathology it is recognized that the most active copper fungicidal compounds are those of appreciable water solubility. One disadvantage of water-soluble copper compounds is phytotoxicity. The more insoluble copper compounds have low phytotoxicity, but also are less fungitoxic. In the field of material preservation, such as, for example, the protection of fabrics from fungi, copper compounds known to the art have the disadvantage of being colored.

According to the present invention, novel and useful copper compounds and compositions have been prepared that are highly fungitoxic, that have a low degree of phytotoxicity, and that have suitable solubility or dispersion properties. In addition, many compounds of this invention are white or a light color and are more useful in the field of material preservation than known copper fungicidal compounds.

An object of this invention is a new class of compounds and compositions.

Another object is a process for the preparation of cuprous thione compounds and hydrohalide acid salts thereof.

An additional object is to provide compounds, compositions, and processes for inhibiting, preventing, and arresting the attack by fungus and similar growth on wood, cotton, leather, fruit, seeds, plants, and other articles.

Further objects and advantages of this invention will be readily seen and appreciated as the same become better known and understood by reference to the following detailed description when considered in conjunction with the specific examples and the claims.

In the process of this invention starting compounds having a functional group represented by a thiourea-type structural formula are used to obtain the corresponding cuprous derivatives, a restriction being that at least one nitrogen atom must have as one of its substituents a hydrogen atom to permit the isomerization

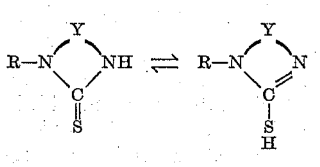

to occur. A nitrogen substituent, as represented by R, may be selected from the group consisting of hydrogen, alkyl radicals, substituted alkyl radicals and aryl radicals; and a nitrogen-linking substituent, as represented by Y, may be selected from the group consisting of a bivalent alkyl radical having at least two carbon atoms, a substituted bivalent alkyl radical having at least two carbon atoms, a bivalent aryl radical, and a substituted bivalent aryl radical. Starting compounds and processes for preparing the same are known to those skilled in the art; and some starting compounds, such as 2-imidazolidinethione or ethylenethiourea, are commercially available.

In the process of the invention, the aforesaid starting compounds, having a functional group represented by the thiourea-type structural formula, are treated with a cuprous ion solution to obtain products having a characteristic group represented by the formula

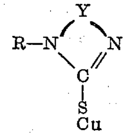

The cuprous ion solution may be prepared, in situ, with the starting compounds or may be prepared apart from the starting compounds. Where the cuprous ion solution is prepared apart from the starting compounds, the cuprous ion solution may be added to the starting compounds or the starting compounds may be added to the cuprous ion solution.

Cuprous ion solutions for the processes of this invention may be prepared from solutions of cuprous salts, or from solutions of cupric compounds by reduction with a reducing agent. Where the cuprous ion solution is prepared by reduction of a cupric compound, preferably the amount of reducing agent should be at least the stoichiometric amount necessary to reduce the cupric compound, and the reducing agent should be of a type that will not react with the starting compound or product. The absence of cupric ions and reducing agents of a type, that reacts with the starting compound or product, assures the absence of undesirable side reactions. Where the cuprous ion solution is prepared from a cuprous salt, a small amount of a reducing agent may be included to assure the absence of cupric ions, for it is well known that cuprous salts frequently oxidize to cupric salt structures. The cuprous ion solution may be prepared in situ with the starting compound by the addition of a cupric compound to a solution containing the starting compound and a suitable reducing agent.

Where the cuprous ion solution is an alkaline or neutral solution, the product obtained is a cuprous compound of the aforesaid starting compounds and has the characteristic group represented by the formula

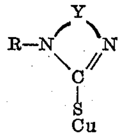

Where the cuprous ion solution is a hydrohalide acid solution, the product is a hydrohalide acid salt of the aforesaid cuprous compound having the characteristic group. A hydrohalide acid is an acid selected from the group consisting of hydrochloric, hydrobromic, hydriodic, and hydrofluoric.

Generally, upon treatment of the hydrohalide acid salt of the cuprous compound having the aforesaid characteristic group with excess alkali, the cuprous compound having the aforesaid characteristic group may be obtained, and upon treatment of the cuprous compound containing the aforesaid characteristic group with excess hydrohalide acid, the hydrohalide acid salt of the cuprous compound containing the aforesaid characteristic group may be obtained.

Compounds containing the aforesaid characteristic group, and compositions containing such compounds, are of value for the control of fungi. By the proper choice of substituents for the nitrogen atoms of the characteristic group, the physical nature, solubility, fungicidal activity, and other properties of such compounds and compositions, may be varied to best suit requirements.

The following are illustrative examples of the process of the present invention and the compounds resulting therefrom. These examples are to be construed as merely illustrative and not as limiting the scope of the present invention.

*Example I*

2-imidazolidinethione was purified by recrystallization from hot water and upon analysis gave nitrogen 27.4 percent and sulfur 31.7 percent.

0.1 mole of copper sulfate and 0.05 mole of dextrose were dissolved in 500 milliliters of distilled water, to which was added 25 milliliters of 3 molar sodium hydroxide solution and 100 milliliters of concentrated 28 percent ammonium hydroxide. This mixture was then digested one-half hour at 80 to 90° C. 0.1 mole of the recrystallized 2-imidazolidinethione in 100 milliliters of distilled water was added to the clear solution. Precipitation was immediate. After 20 minutes' digestion, the product was separated by filtration, washed with distilled water, and air dried. The product was white-to-light-gray and had the formula

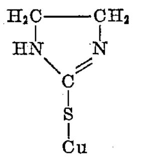

Chemical analysis of the product gave copper 38.3 percent, sulfur 19.4 percent, and nitrogen 17.1 percent. Theoretical analysis for cuprous iso-2-imidazolidinethione (cuprous 2-mercapto-2-imidazoline) is copper 38.6 percent, sulfur 19.5 percent, and nitrogen 17.0 percent.

*Example II*

0.05 mole of 2-imidazolidinethione and 0.1 mole of sodium hydroxide and 0.1 mole of dextrose were dissolved in 200 milliliters of distilled water, heated to 60° C., and a water solution of 0.05 mole copper sulfate added slowly. Precipitation was immediate and practically quantitative. The product was filtered, washed with distilled water, and air dried. The yield of cuprous iso-2-imidazolidinethione (cuprous 2-mercapto-2-imidazoline) was 7.5 grams or 99 percent of the theoretical yield. Chemical analysis of the product gave copper 37.9 percent, and sulfur 19.3 percent.

*Example III*

N-n-butyl ethylenediamine was prepared by the method of Linsker and Evans (Journal of the American Chemical Society, 67 (9), September (1945), 1581). N-n-butyl ethylenediamine was then treated with carbon disulfide to obtain N-n-butyl-2-imidazolidinethione.

A cuprous ion solution was prepared in the following manner. A portion of a solution containing 100 milliliters of 1-molar copper sulfate and 50 milliliters of 28 percent concentrated ammonium hydroxide was added to a solution containing 0.2 mole of sodium hydroxide in 100 milliliters of water and 250 milliliters of 28 percent concentrated ammonium hydroxide until a definite blue color was obtained. Then 0.05 mole of dextrose was added, the mixture warmed slightly, and when the blue color disappeared, additional portions of the copper sulfate solution were added at such a rate that the solution was never completely blue.

After the copper sulfate solution had been added to obtain the cuprous ion solution, a 0.1-mole solution of N-n-butyl-2-imidazolidinethione in a solution of 150 milliliters of ethyl alcohol and 100 milliliters of distilled water was added dropwise with constant stirring of the cuprous ion solution. A precipitate formed immediately. After all the N-n-butyl-2-imidazolidinethione solution had been added, the solution was stirred, and permitted to digest for approximately 1 hour. The solution was cooled, filtered, and the precipitate collected and air dried. The product represented by the formula

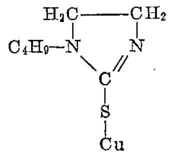

was obtained with a yield of 15.4 grams or 73 percent of the theoretical yield of cuprous iso-N-n-butyl-2-imidazolidinethione (cuprous N-n-butyl-2-mercapto-2-imidazoline). Chemical analysis of the product gave copper 28.5 percent and sulfur 14.6 percent. Theoretical analysis for cuprous iso-N-n-butyl-2-imidazolidinethione (cuprous N-n-butyl-2-mercapto-2-imidazoline) is copper 28.8 percent and sulfur 14.5 percent.

*Example IV*

A method similar to the method of Linsker and Evans was used to prepare N-n-octyl ethylenediamine. This N-n-octyl ethylenediamine was treated with carbon disulfide to obtain N-n-octyl-2-imidazolidinethione.

To a solution of 0.4 mole of sodium hydroxide in 100 milliliters of water was added 600 milliliters of concentrated 28 percent ammonium hydroxide and 0.1 mole of dextrose. This mixture was then warmed to 50 to 60° C. on a steam bath, and a solution of 0.15 mole of cupric sulfate in 100 milliliters of water was added with stirring, in small portions. Soon after the last of the copper sulfate was added, the solution lost its blue color and was a clear, intense red. To this solution of cuprous ion was added with stirring a slurry of 0.05 mole of N-n-octyl-2-imidazolidinethione in ethyl alcohol. A white precipitate formed immediately. After 1 hour's digestion at 55 to 60° C. the product was filtered, collected, washed with water, and then dried. The product represented by the formula

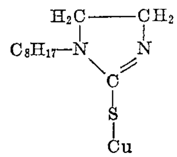

was obtained with a yield of 12.2 grams or 87.5 percent of the theoretical yield of cuprous iso-N-n-octyl-2-imidazolidinethione (cuprous N-n-octyl-2-mercapto-2-imidazoline).

*Example V*

Normal decyl ethylenediamine was prepared by a method similar to the method of Linsker and Evans and treated with carbon disulfide to obtain N-n-decyl-2-imidazolidinethione. The melting point of the N-n-decyl-2-imidazolidinethione obtained by this method was 62 to 63° C.

An aqueous solution of 0.06 mole of cupric sulfate was reduced to a cuprous compound with dextrose at about 80° C., and 0.06 mole of N-n-decyl-2-imidazolidinethione in ethyl alcohol was then added to the cuprous ion solution while hot. The oily liquid which immediately formed, solidified on cooling, was separated by filtration, washed with warm ethyl alcohol and with warm acetone, and finally dried. The product represented by the formula

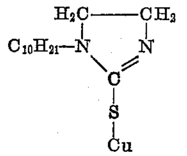

was obtained with a yield of 14.2 grams or 77 percent of the theoretical yield of cuprous iso-N-n-decyl-2-imidazolidinethione (cuprous N-n-decyl-2-mercapto-2-imidazoline). Chemical analysis of the product gave copper 21.2 percent, sulfur 10.6 percent, and nitrogen 8.8 percent. Theoretical analysis for cuprous iso-N-n-decyl-2-imidazolidinethione (cuprous N-n-decyl-2-mercapto-2-imidazoline) is copper 20.8 percent, sulfur 10.5 percent, and nitrogen 9.2 percent.

The product after recrystallization from acetone was light gray and melted at 105 to 108° C. with decomposition. The product was fairly soluble in ketones and somewhat soluble in Sovacide 544–C. Sovacide 544–C is the name of a light oil for agricultural sprays manufactured and sold by Socony-Vacuum Oil Company of New York, New York.

*Example VI*

1,2-propanediamine was reacted with carbon disulfide to obtain 4-methyl-2-imidazolidinethione of a melting point of 99 to 100° C.

0.4 mole of sodium hydroxide was dissolved in 50 milliliters of water with stirring. Stirring was continued and 600 milliliters of 28 percent ammonium hydroxide added, followed by an addition of 0.1 mole of dextrose. Then the mixture was heated to 40° C. with stirring and the heat discontinued. 0.1 mole of copper sulfate in 100 milliliters of distilled water was added dropwise to the mixture with stirring to obtain a clear red solution of a cuprous ion.

0.1 mole of 4-methyl-2-imidazolidinethione, prepared as described above, was dissolved in 100 milliliters of distilled water and this solution added dropwise with stirring to the solution of cuprous ion over a period of about 15 minutes. A white precipitate formed. The precipitate was collected by filtration, washed well with distilled water until free of ammonium hydroxide, and dried overnight at 60 to 70° C. The yield was 16 grams for a yield of approximately 89 percent of cuprous iso-4-methyl-2-imidazolidinethione (cuprous 4-methyl-2-mercapto-2-imidazoline) having the formula

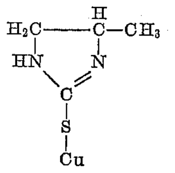

Chemical analysis of the product gave copper 34.2 percent, sulfur 17.0 percent, and nitrogen 15.0 percent. Theoretical analysis for cuprous iso-4-methyl-2-imidazolidinethione (cuprous 4-methyl-2-mercapto-2-imidazoline) is copper 35.6 percent, sulfur 17.9 percent, and nitrogen 15.7 percent.

*Example VII*

Acetone cyanohydoin was treated with carbon disulfide to obtain 5-5-dimethyl-2,4-dithiohydantoin. The melting point of the product was 145 to 146° C.

5-5-dimethyl-2,4-dithiohydantoin was dissolved with alkali in 200 milliliters of cold water. 0.25 mole of cuprous chloride was dissolved in 150 milliliters of a saturated solution of sodium chloride and a small amount of hydroxylamine hydrochloride added to assure absence of any cupric ions. This cuprous ion solution was then added slowly with stirring to the alkaline aqueous solution of the product. A reddish-orange colored precipitate was filtered from the solution, collected, washed free of alkali, and air dried. This precipitate was then recrystallized from hot methyl ethyl ketone. The product is represented by the formula

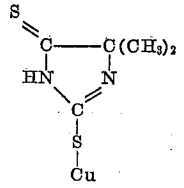

Chemical analysis gave copper 27.2 percent and sulfur 27.2 percent. Theoretical analysis for monocuprous 2-iso-5,5-dimethyl-2,4-dithiohydantoin is copper 28.5 percent and sulfur 28.7 percent.

*Example VIII*

Trimethylenediamine was reacted with carbon disulfide to obtain hexahydro-2-pyrimidinethione having a melting point of 206 to 208 C°.

A clear red solution of cuprous ion was prepared as described in Example VI. 0.1 mole of hexahydro-2-pyrimidinethione dissolved in about 100 milliliters of distilled water was added dropwise with stirring to the solution of cuprous ion over a period of about 15 minutes. A light gray precipitate formed. The precipitate was collected by filtration, washed well with distilled water until free of ammonium hydroxide, and dried overnight at 60 to 70° C. The yield was 16 grams for a yield of approximately 89 percent of cuprous iso-2-hexahydropyrimidinethione having the formula

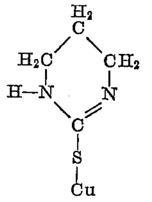

Chemical analysis of the product gave copper 34.7 percent, sulfur 16.2 percent, and nitrogen 15.8 percent. Theoretical analysis for cuprous iso-2-hexahydropyrimidinethione is copper 35.6 percent, sulfur 17.9 percent, and nitrogen 15.7 percent.

*Example IX*

A hydrochloride derivative of a portion of the product, cuprous iso-2-imidazolidinethione (cuprous 2-mercapto-2-imidazoline), of Example II was prepared. Three grams of cuprous iso-2-imidazolidinethione was dissolved in 400 milliliters of hot concentrated hydrochloric acid. Precipitation occurred on cooling this solution. The product is represented by the formula

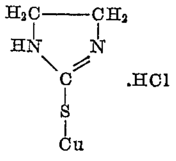

Chemical analysis gave copper 30.7 percent, sulfur 15.3 percent, and chlorine 17.4 percent. The theoretical content of cuprous iso-2-imidazolidinethione hydrochloride (cuprous 2-mercapto-2-imidazoline hydrochloride) is copper 31.6 percent, sulfur 16.0 percent, and chlorine 17.7 percent.

*Example X*

100 milliliters of a 1-molar solution of cuprous chloride in 400 milliliters of a concentrated hydrochloric acid that had been diluted to 1 liter by the addition of water, was added dropwise to a solution containing 0.1 mole of 2-imidazolidinethione in 400 milliliters of ethyl alcohol. Precipitation occurred almost immediately. Stirring was continued after the addition of all of the alcoholic 2-imidazolidinethione solution, and the solution digested for approximately 1 hour. The solution was then filtered, and the precipitate collected and air dried. The yield was 14.1 grams or 70.5 percent of the theoretical yield of cuprous iso-2-imidazolidinethione hydrochloride (cuprous 2-mercapto-2-imidazoline hydrochloride).

*Example XI*

The product of Example X was stirred in water to form a slurry. The slurry was made slightly basic by addition of 5 N sodium hydroxide solution. The product was then filtered, collected, washed, and air dried. The yield was 10.6 or 64.5 percent of the theoretical yield of cuprous iso-2-imidazolidinethione.

*Example XII*

4-methyl-2-imidazolidinethione as prepared in Example VI was used in this example.

0.1 mole of cuprous oxide covered with 100 milliliters of concentrated hydrochloric acid was heated. The cuprous chloride which formed was taken into solution by the addition of 200 milliliters of distilled water. 0.2 mole of 4-methyl-2-imidazolidinethione in 100 milliliters of hot distilled water was added to the cuprous chloride solution with stirring. Precipitation occurred immediately. The slurry of water and the precipitate was cooled to room temperature and filtered to collect the precipitate. After air drying the product weighed 40.0 grams for a yield of 93.0 percent of cuprous iso-4-methyl-2-imidazolidinethione hydrochloride (cuprous 4-methyl-2-mercapto-2-imidazoline hydrochloride) having the formula

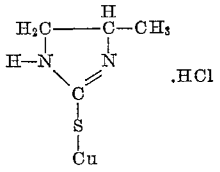

An attempt was made to convert the product, cuprous iso-4-methyl-2-imidazolidinethione hydrochloride (cuprous 2-mercapto-2-imidazoline hydrochloride), to the neutral salt by washing with dilute sodium hydroxide. However, the product turned dark gray indicating decomposition.

*Example XIII*

2-mercaptobenzimidazole was dissolved in 300 milliliters of hot ethyl alcohol and diluted to 500 milliliters with water. 0.25 mole of cuprous chloride was dissolved in 150 milliliters of a saturated solution of sodium chloride, and a small amount of hydroxylamine hydrochloride added to reduce any cupric icn present. When the cuprous chloride solution was added dropwise to the aqueous alcoholic solution of 2-mercaptobenzimidazole with stirring, precipitation occurred. The stirring was continued for 2 hours after the addition of all the cuprous chloride solution. The solution was filtered, the precipitate collected, washed with water until free of chloride ion, then washed with alcohol and ether, and dried at 50° C. for 8 hours. The product is represented by the formula

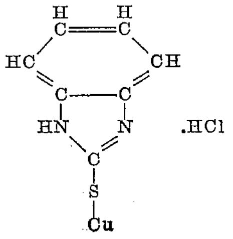

Chemical analysis of the product gave copper 26.0 percent, sulfur 12.1 percent, and chlorine 13.5 percent. Theoretical analysis for cuprous iso-2-mercaptobenzimidazole hydrochloride is copper 25.5 percent, sulfur 12.9 percent, and chlorine 14.6 percent.

The foregoing examples illustrate the preparation of cuprous thione derivatives of starting compounds containing the functional group, represented by the thiourea-type structural formula, wherein at least one nitrogen has as one of its substituents a hydrogen atom. Examples I to XIII, inclusive, illustrate nitrogen substituents that permit the utilization of starting compounds having ring-type structural formulae having a thiourea-type functional group. Examples I to XII illustrate as nitrogen-linking substituents linking-bridge alkyl radicals having at least two carbon atoms. Example XIII illustrates as a nitrogen-linking substituent a linking-bridge aryl structure that permits utilization of starting compounds of a bicyclic ring-type structural formula having a thiourea-type functional group. A nitrogen substituent may be selected from the group consisting of hydrogen, alkyl radicals, substituted alkyl radicals and aryl radicals, and a nitrogen-linking substituent may be selected from bivalent linking-bridge radicals having at least two carbon atoms, such as a bivalent alkyl radical having at least two carbon atoms, a substituted bivalent alkyl radical having at least two carbon atoms, a bivalent aryl radical, and a substituted bivalent aryl radical.

As is well known by those skilled in the art, the choice of substituents for organic compounds influences the solubility, the physical nature, and the physical properties of the compound. For example, in Example I, wherein the starting compound is 2-imidazolidinethione, each nitrogen atom has a hydrogen substituent; while in Example V, wherein the starting compound is n-decyl-2-imidazolidinethione, one of the nitrogen atoms has a n-decyl radical substituent. A comparison of the solubilities of the starting compounds of Examples I and V, and their corresponding cuprous thione derivatives of this invention, showed that the influence of the n-decyl radical substituent on a nitrogen atom for the starting compound of Example V made the starting compound and corresponding cuprous thione derivative of Example V more soluble in organic media than the corresponding starting compound and cuprous thione derivative of Example I. Other suitable selections for substituents for the nitrogen atoms of the functional group, represented by the thiourea-type structural formula, will be obvious to those skilled in the art and are included in the invention where it is desired to modify the starting compounds and their cuprous thione derivatives to best suit the application requirements.

In the formation of the cuprous thione compounds of the invention wherein the cuprous ion solution is prepared by the reduction of a cupric compound, although dextrose and hydroxylamine hydrochloride have been specifically illustrated as reducing agents, ti is to be understood the invention is not so limited and other suitable reducing agents may be used. For example, when preparing the cuprous ion solution in situ with the starting compounds, other reducing sugars may be used in place of dextrose. Reducing agents that react with the starting compounds, or the cuprous derivatives formed thereof, should be avoided.

In the formation of the cuprous thione compounds of the invention, wherein the cuprous ion solution is prepared by the reduction of a cupric compound, although dextrose and hydroxylamine hydrochloride have been specifically illustrated as reducing agents, it is to be understood the invention is not so limited and other suitable reducing agents may be used. For example, when preparing the cuprous ion solution in situ with the starting compounds, other reducing sugars may be used in place of dextrose. Reducing agents that react with the starting compounds, or the cuprous derivatives formed thereof, should be avoided.

In the formation of the cuprous thione compounds of the invention, wherein the cuprous ion solution is prepared from a cuprous salt and a solvent, it is preferred that a small amount of a suitable reducing agent be included in the cuprous ion solution to assure the absence of cupric ions. Where sufficient hydrohalide acid is present in the cuprous ion solution, the product, a cuprous thione hydrohalide acid salt derivative, is obtained without the cuprous thione being isolated.

The value and utility of the cuprous compounds of this invention and compositions including the same, in inhibiting, preventing, and arresting the growth of fungi and similar growth has been shown by a variety of tests.

Indicative results of the fungitoxicity of materials may be obtained according to the method of the Committee on Standardization of Fungicidal Tests (Phytopathology, 37, 354–356 (1947)). By this method successive test tube dilutions of the material in solution or suspension are made with slide fungi germination tests run on the various dilutions. In this method materials are rated according to the concentration needed to inhibit 50 percent of the fungus spores. Compounds that can effect this inhibition at a concentration of less than 1 p.p.m. are rated AA, of 1 to 10 p.p.m. are rated A, of 10 to 100 p.p.m. are rated B, of 100 to 1000 p.p.m. are rated C, and of greater than 1000 p.p.m. are rated D. Tests were made on compounds of this invention according to the method of the Committee on Standardization of Fungicidal Tests and are in the table.

In the table, specimen No. 1 is basic copper sulfate; No. 2 is cuprous iso-2-imidazolidinethione (cuprous 2-mercapto-2-imidazoline) prepared by the method as illustrated in Example I; No. 3 is cuprous iso-N-n-butyl-2-imidazolidinethione (cuprous N-n-butyl-2-mercapto-2-imidazoline) prepared by the method as illustrated in Example III, No. 4 is cuprous iso-N-n-decyl-2-imidazolidinethione (cuprous N-n-decyl-2-mercapto-2-imidazoline) prepared by the method as illustrated in Example V; No. 5 is cuprous iso-2-imidazolidinethione monohydrochloride (cuprous 2-mercapto-2-imidazoline hydrochloride) prepared by the method as illustrated in Example IX; No. 6 is cuprous iso-2-hexahydropyrimidinethione prepared by the method illustrated in Example VIII; and No. 7 is cuprous iso-4-methyl-2-imidazolidinethione (cuprous 4-methyl-2-mercapto-2-imidazoline) prepared by the method illustrated in Example VI.

| No. | Compound | Fungi | |
|---|---|---|---|
| | | *Alternaria oleracea* | *Monilinia fructicola* |
| 1 | Basic copper sulfate | B, B | B, B |
| 2 | Cuprous iso-2-imidazolidinethione | A, AA | A, A |
| 3 | Cuprous iso-N-n-butyl-2-imidazolidinethione | A | A |
| 4 | Cuprous iso-N-decyl-2-imidazolidinethione | C, B | C, B |
| 5 | Cuprous iso-2-imidazolidinethione hydrochloride | A | A |
| 6 | Cuprous iso-2-hexahydropyrimidinethione | C | B |
| 7 | Cuprous iso-4-methyl-2-imidazolidinethione | C | B |

The tests showed that cuprous iso-N-decyl-2-imidazolidinethione, cuprous iso-2-hexahydropyrimidinethione, and cuprous iso-4-methyl-2-imidazolidinethione almost were the equivalent of the conventional fungicide, basic copper sulfate, and that cuprous iso-2-imidazolidinethione, cuprous iso-N-n-butyl-2-imidazolidinethione, and cuprous iso-2-imidazolidinethione monohydrochloride were superior to basic copper sulfate in inhibiting the germination of the fungi, *Alternaria oleracea* and *Monilinia fructicola*.

McCallam and Wellman (Contributions of the Boyce Thompson Institute, 13, 93–134 (1943)) describe a method for determining an ED–95 value, the percent spray concentration required to give a 95 percent control of the fungus disease. By the method of McCallum and Wellman with early blight of tomatoes, cuprous iso-2-imidazolidinethione (cuprous 2-mercapto-2-imidazoline) gave an ED–95 value of 0.007 while tribasic copper sulfate, a conventional fungicide, gave an ED–95 value of 0.30. The treated tomato plants showed no signs of phytotoxic effects from the cuprous iso-2-imidazolidinethione. The tests showed cuprous iso-2-imidazolidinethione was a more active fungicide than tribasic copper sulfate for this important plant disease.

Phytotoxicity tests were made by spraying tomato plants and Lima bean plants with concentrations of the test material. Plants were sprayed with 20 milliliters of a water suspension of each test material of 0.1 to 1.0 concentrations. Estimations of plant injury were made fourteen days after spraying. A plant rating of 0 means no injury, 1 means 0 to 3 percent leaf surfaces damaged, 2 means 3 to 6 percent leaf surface damaged, and similarly, 3 means 6 to 12 percent, 4 means 12 to 25 percent, and 5 means 25 to 50 percent, and 6 means 50 to 75 percent and 7 means 75 to 100 percent. For both tomato plants and Lima bean plants cuprous iso-2-imidazolidinethione (cuprous 2-mercapto-2-imidazoline) gave a phytotoxicity rating of 0 for 0.1 percent concentration and of 1 for 1.0 percent concentration. Tribasic copper sulfate, a commercial fungicide material, gave a phytotoxicity rating for Lima bean plants of 1 for 0.1 percent concentration and of 2 for 1.0 percent concentration. Copper sulfate pentahydrate, gave a phytotoxicity rating for tomato plants of 1 for 0.1 percent concentration and of 2 for 1.0 percent concentration and for Lima bean plants of 4 for 0.1 percent concentration and of 4 for 1.0 percent concentration. The tests showed cuprous iso-2-imidazolidinethione was less phytotoxic to both tomato and Lima bean plants than the commercial fungicide.

The methods of applying the compounds and compositions containing the same, may be varied to include dusting or tumbling with powders, spraying with solutions, emulsions or suspensions, soaking in solutions, or applying directly as a paste or a coating. An antifungal composition of this invention may comprise a compound of the invention and a carrier selected from the group consisting of a finely divided solid, a liquid, and mixtures thereof. For example, cuprous iso-2-imidazolidinethione (cuprous 2-mercapto-2-imidazoline) is readily dispersible in water to give a finely divided, slow settling suspension exceptionally adaptable for spray application to growing plants and for slurry applications to seeds. The dry, finely divided, powder deposited from the spray clings tenaciously to plant foliage.

Another process for antifungal treating of an article comprises coating and/or impregnating the article with a starting compound of the invention, whereby said starting compound is retained, at least in part, by said article, and treating the coated and/or impregnated article with a cuprous ion solution of the invention to form a fungal resistant composite consisting of said article and a cuprous thione derivative of this invention.

While preferred compounds, compositons, and methods have been shown and described, the invention may be embodied in other specific forms without departing from the spirit or essential attributes thereof, and the present embodiments illustrated and described are to be considered in all respect as illustrative and not restrictive, reference being made to the appended claims rather than to the foregoing description to indicate the scope of the invention.

What is claimed is:

1. A member selected from the group consisting of compounds of the formula

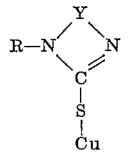

and hydrohalide acid salts thereof, wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleus of 2,4-dithiohydantoin, and the radicals of the lower alkyl derivatives of the aforesaid members of the group.

2. Cuprous iso-2-imidazolidinethione.

3. Cuprous iso-2-imidazolidinethione hydrochloride.

4. Cuprous iso-N-n-butyl-2-imidazolidinethione.

5. Cuprous iso-4-methyl-2-imidazolidinethione.

6. Cuprous iso-2-hexahydropyrimidinethione.

7. A compound which corresponds to the formula

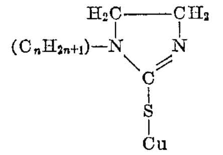

wherein $n$ is an integer from 1 to 10.

8. In a process for preparing a member selected from the group consisting of a cuprous thione derivative and a cuprous thione derivative hydrohalide acid salt of a compound of the formula

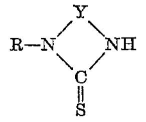

wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleus of 2-4-dithiohydantoin, and the radicals of the lower alkyl derivatives of the aforesaid members of the group, the step which comprises contacting said compound with an aqueous solution containing a cuprous ion in the presence of a water-soluble alkali.

9. In the process of claim 8 inclusion of a preceding step which comprises dissolving a cupric salt in an aqueous solution containing an amount of a reducing agent for the cupric salt in at least the stoichiometric amount of the cupric salt, whereby the aqueous solution is substantially free from cupric ions.

10. In a process for preparing a member selected from the group consisting of a cuprous thione derivative and a cuprous thione derivative hydrohalide acid salt of a compound of the formula

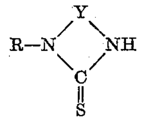

wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleus of 2-4-dithiohydantoin, and the radicals of the lower alkyl derivatives of the aforesaid members of the group, the step which comprises adding a cupric salt to an aqueous solution containing said compound, a minor amount of a water-soluble alkali, and an amount of a reducing agent for the cupric salt in at least the stoichiometric amount of the cupric salt.

11. An antifungal composition consisting essentially of a carrier and a member selected from the group consisting of compounds of the formula

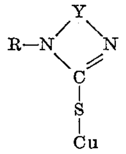

and hydrohalide acid salts thereof, wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleus of 2,4-dithiohydantoin, and the radicals of the lower alkyl derivatives of the aforesaid members of the group.

12. An antifungal composition consisting essentially of a major proportion of water and a minor proportion of cuprous iso-2-imidazolidinethione.

13. An antifungal composition consisting essentially of a major proportion of water and a minor proportion of cuprous iso-2-imidazolidinethione hydrochloride.

14. An antifungal composition consisting essentially of a major proportion of water and a minor proportion of cuprous iso-N-n-butyl-2-imidazolidinethione.

15. In a process for antifungal treatment of an article the steps which comprise: treatment of the article with a compound of the formula

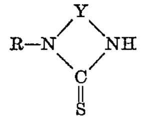

wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleous of 2-4-dithiohydantoin, and the radicals of the lower alkyl derivatives of the aforesaid members of the group, whereby said article retains said compound; and contacting said treated article with an aqueous solution containing a cuprous ion in the presence of a water-soluble alkali, whereby said treated article is converted to a composite article comprising the article and a member selected from the group consisting of a cuprous thione derivative and a cuprous thione derivative hydrohalide acid salt of the compound.

16. A process for control of fungi which comprises contacting a plant with a composition consisting essentially of a carrier and a member selected from the group consisting of compounds of the formula

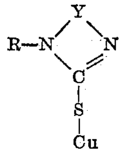

and hydrohalide acid salts thereof, wherein R is a member selected from the group consisting of hydrogen, an alkyl radical containing one to ten carbon atoms, and a phenyl radical, and Y is a bivalent radical selected from the group consisting of a dimethylene radical, a trimethylene radical, an o-phenylene radical, a radical which will complete the nucleous of 2-4-dithiohydantoin, and the radicals of the lower alkyl derivatives of the aforesaid members of the group.

17. A process for control of fungi which comprises contacting a plant with a composition consisting essentially of a major proportion of a carrier and a minor proportion of cuprous iso-2-imidazolidinethione.

References Cited in the file of this patent

UNITED STATES PATENTS

| | | |
|---|---|---|
| 2,323,445 | Bockmuhl et al. | July 6, 1943 |
| 2,577,700 | Croxall et al. | Dec. 4, 1951 |